(12) United States Patent
Gapontsev et al.

(10) Patent No.: US 11,862,926 B2
(45) Date of Patent: Jan. 2, 2024

(54) HIGH POWER CLADDING PUMPED SINGLE MODE FIBER RAMAN LASER FEES

(71) Applicant: IPG PHOTONICS CORPORATION, Oxford, MA (US)

(72) Inventors: Valentin Gapontsev, Worcester, MA (US); Igor Samartsev, Westborough, MA (US); Nikolai Platanov, Worcester, MA (US)

(73) Assignee: IPG PHOTONICS CORPORATION, Marlborough, MA (US)

( * ) Notice: Subject to any disclaimer, the term of this patent is extended or adjusted under 35 U.S.C. 154(b) by 0 days.

(21) Appl. No.: 16/613,463

(22) PCT Filed: May 14, 2018

(86) PCT No.: PCT/US2018/032539
§ 371 (c)(1),
(2) Date: Nov. 14, 2019

(87) PCT Pub. No.: WO2019/013862
PCT Pub. Date: Jan. 17, 2019

(65) Prior Publication Data
US 2021/0159662 A1 May 27, 2021

Related U.S. Application Data

(60) Provisional application No. 62/506,278, filed on May 15, 2017.

(51) Int. Cl.
*H01S 3/30* (2006.01)
*H01S 3/067* (2006.01)
(Continued)

(52) U.S. Cl.
CPC ......... *H01S 3/302* (2013.01); *H01S 3/0675* (2013.01); *H01S 3/06733* (2013.01);
(Continued)

(58) Field of Classification Search
CPC .............. H01S 3/302; H01S 3/094053; H01S 3/094038; H01S 3/094069
See application file for complete search history.

(56) References Cited

U.S. PATENT DOCUMENTS 5,818,630 A * 10/1998 Fermann ............ H01S 3/067
359/341.31
7,724,422 B2 * 5/2010 Abramczyk .......... G02B 6/105
359/341.1

(Continued)

OTHER PUBLICATIONS

Codemard et al. ("High-power continuous wave cladding pumped Raman fiber laser", Optics Letters, vol. 31, No. 15, Aug. 1, 2006) (Year: 2006).*

(Continued)

*Primary Examiner* — Tod T Van Roy
(74) *Attorney, Agent, or Firm* — Yuri B. Kateshov, Esq.; Caroline J. Roush, Esq.

(57) ABSTRACT

A Raman fiber laser source (RFLS) is configured with a feeding fiber delivering MM pump radiation to an inner cladding of double-clad MM Raman fiber laser. The MM pump radiation has a sufficient power to produce Raman scattering in the MM Raman fiber converting the pump radiation to a MM signal radiation at a Raman-shifted wavelength λram which is longer than a wavelength λpump of the pump radiation. The RFLS further has a pair of spaced reflectors defining therebetween a resonator for the signal radiation at a $1^{st}$ Stokes wavelength and flanking at least part of the MM core of the Raman fiber which is provided with a central core region which is doped with impurities for enhancing Raman process. The reflectors and central core region are dimensioned to correspond to the fundamental mode of the MM signal radiation.

9 Claims, 2 Drawing Sheets

(51) Int. Cl.
*H01S 3/08045* (2023.01)
*H01S 3/094* (2006.01)
*H01S 3/17* (2006.01)

(52) U.S. Cl.
CPC .... *H01S 3/08045* (2013.01); *H01S 3/094007* (2013.01); *H01S 3/094038* (2013.01); *H01S 3/094042* (2013.01); *H01S 3/094053* (2013.01); *H01S 3/094069* (2013.01); *H01S 3/176* (2013.01)

(56) References Cited

U.S. PATENT DOCUMENTS

| | | | | |
|---|---|---|---|---|
| 9,231,365 | B1 * | 1/2016 | Wisk | H01S 3/302 |
| 9,529,148 | B2 * | 12/2016 | Kashiwagi | H01S 3/0672 |
| 10,746,933 | B2 * | 8/2020 | Guo | H01S 3/0941 |
| 2009/0103874 | A1 * | 4/2009 | Broeng | H01S 3/06754 |
| | | | | 372/6 |
| 2011/0170563 | A1 | 7/2011 | Heebner et al. | |
| 2015/0117473 | A1 * | 4/2015 | Rockwell | H01S 3/06729 |
| | | | | 372/3 |
| 2015/0229097 | A1 * | 8/2015 | Oba | H01S 3/0912 |
| | | | | 372/6 |
| 2015/0364897 | A1 * | 12/2015 | Wisk | H01S 3/302 |
| | | | | 359/334 |
| 2016/0067780 | A1 | 3/2016 | Zediker et al. | |
| 2017/0162998 | A1 * | 6/2017 | Kashiwagi | H01S 3/06716 |
| 2017/0294754 | A1 * | 10/2017 | Leonardo | G02F 1/3532 |

OTHER PUBLICATIONS

Baek et al. ("Single mode Raman fiber laser based on multimode fiber", Optics Letters, vol. 29, No. 2, Jan. 15, 2004) (Year: 2004).*
Baek Sung et al., "Single-mode Rama fiber laser based on a multimode fiber", Optics Letters, vol. 29, No. 2, Jan. 15, 2004, pp. 153-155.
Kablukov et al., "An I.D-pumped Raman fiber laser operating below 1 um", Laser Physics Letters, vol. 10, No. 8, Aug. 1, 2013, p. 085103.

* cited by examiner

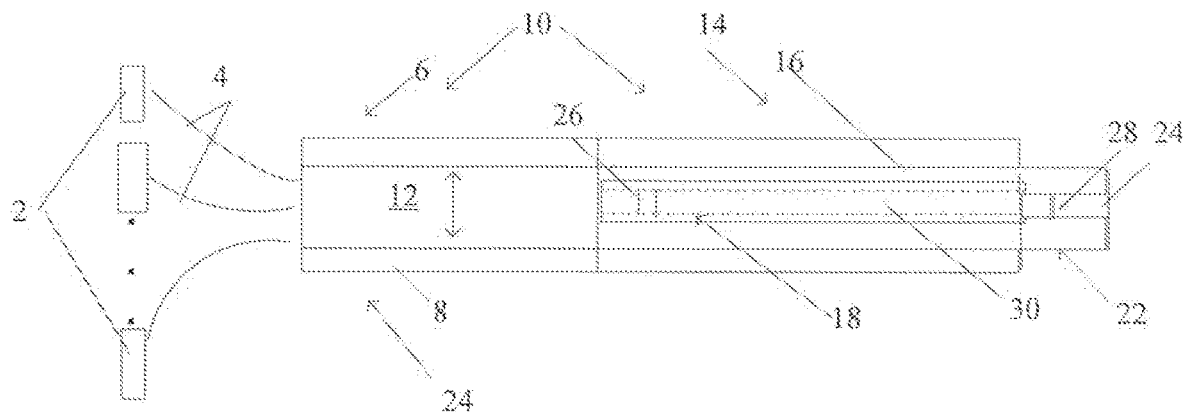
FIG. 1A amended
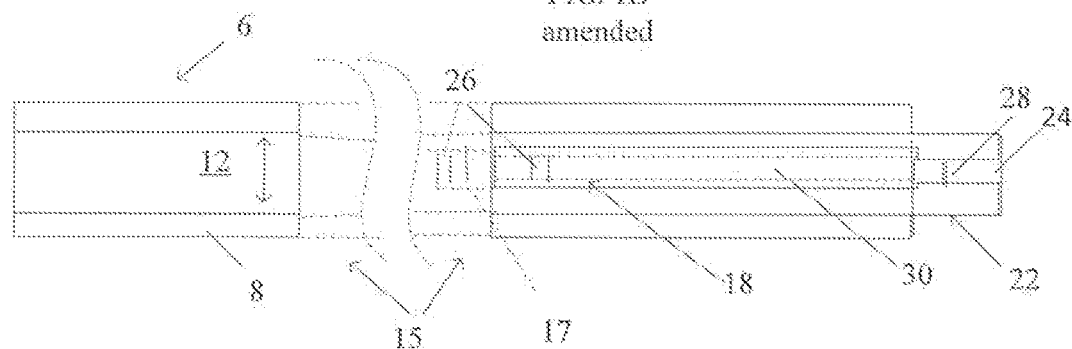
FIG. 1B amended
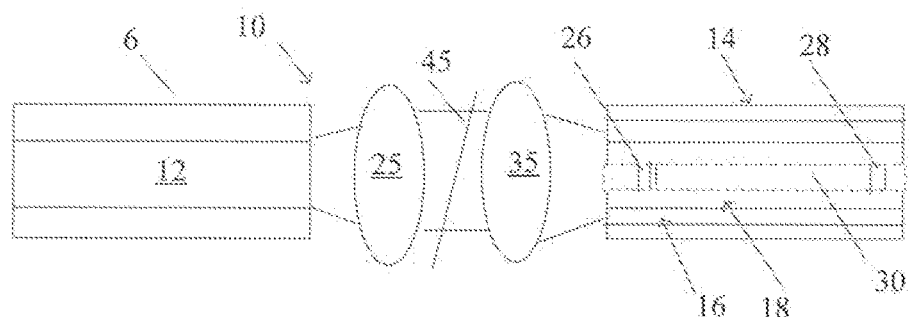
FIG. 2 amended

HIGH POWER CLADDING PUMPED SINGLE MODE FIBER RAMAN LASER FEES

BACKGROUND OF THE DISCLOSURE

Field of the Disclosure

The present disclosure relates to high power continuous wave (CW) Raman fiber laser systems operative to output a single mode (SM) laser beam in a power range between a few kilowatts (kW) and tens of kWs. In particular, this invention discloses a high power fiber laser pump outputting multimode (MM) pump light which is end-coupled into the cladding of a multimode (MM) Raman fiber capable of outputting kW-level SM signal light with $M^2 \leq 1.1$.

Background Art Discussion

Fiber lasers provide efficient conversion of an inferior pump radiation delivered by multimode laser diodes (LDs) into a high-quality laser beam. In high-power fiber lasers, several powerful multimode LDs are usually coupled (e.g., via pump combiner) to the silica cladding of a double-clad active fiber having the core doped by rare earth elements, such as ytterbium (Yb), erbium (Er), etc. The pump radiation guided by the fiber cladding excites the dopants in the core thus providing amplification for the core-guided light which is emitted in the fundamental transverse mode radiation with nearly the Gaussian beam profile provided certain conditions are met by the geometry of the fiber. The known all-fiber laser configurations are distinguished by a generation of high quality laser beam in a wide range of output powers.

As known, laser generation is possible in passive fibers owing to inelastic Raman scattering of pump radiation resulting in amplification of the shifted scattered light. When two laser beams—pump and signal—at respective different wavelengths propagate together through a Raman-active medium, the longer wavelength, i.e., the Stokes wave can experience optical amplification at the expense of the shorter wavelength pump beam—the phenomenon known as stimulated Raman emission (SRS). One of the unique properties of SRS includes a beam cleanup, i.e., enhanced brightness through SRS in a MM fiber, and fast energy transfer between pump and Raman signal lights. Thus the SRS provides an appealing solution to transform MM light into SM laser output both in CW and pulsed regimes.

Since the fiber Raman lasers/amplifiers (FRL and FRA), respectively are based on the pump-induced Raman gain in a passive fiber, these devices have fundamental differences in lasing properties as compared with rare earth-doped fibers, namely it features small quantum defect for the first stokes, fast response of the gain on pump variations, low background spontaneous emission, as well as absence of photo-darkening effect that is a problem in doped active fibers especially at short wavelengths.

The output power of a conventional core-pumped SM Raman fiber laser is limited by the by the availability of a high power SM diode lasers (DL). The levels of power are dramatically increased by using a MM multi-clad Raman fiber as a gain medium and high power MM pump light which is end-pumped into the inner cladding of the Raman fiber. One of multiple configurations utilizing cladding pumped Raman fibers is reported by Codemard et al in "High power CW cladding pumped Raman fiber laser." Optics Letters/Vol. 31, No. 15, Aug. 1, 2006. Using a MM fiber laser pump, the disclosed in this paper RFL features a double clad Raman fiber with a MM core which supports only a fundamental mode (FM) of the desired Stokes wavelength, germanium-doped inner and outer silica claddings. The Raman gain occurs throughout the MM core and inner cladding. The FM-selection is achieved by a fiber Bragg grating (FBG) with a pitch adjusted to for the effective index of the FM. As customary in the art, the core has a raised index due to a high concentration of dopants, such as germanium, known to enhance the Raman process.

The disclosed in this paper RFL is capable of outputting several watts in a SM. The single modality is achieved by the use of a true SM output fiber which is spliced to the end of the Raman fiber. The cores of respective Raman and output fibers are configured such that respective mode field diameters (MFD) of single and fundamental modes substantially match one another. The Raman resonant cavity is defined between strong and weak FBGs and providing a gain substantially only to a fundamental mode at the stokes wavelength. However, the SM output is obtained by using the SM output fiber filtering out undesirable high order modes which are present at the output of the Raman fiber.

The necessity of doping the entire MM core of the above-disclosed Raman fiber at the reported high concentration levels adds complexity and cost to the fiber manufacturing process. The reported signal powers are far from satisfying current industrial needs. However, the Applicants are aware of the existence of a 1.3 kW Raman laser operating in a continuous regime (CW). Yet, to the best of Applicants' knowledge, this laser outputs light with an $M^2$ factor substantially higher than that of the desired quality output.

Accordingly, a need still exists for a MM Raman clad-pumped fiber laser source which is operative to output SM, bright signal light in a multi-kW power range with beam quality $M^2 \leq 1.1$.

SUMMARY OF THE INVENTION

The inventive laser source meets this need by utilizing a high power fiber laser-based pump outputting MM pump light which is end-coupled into the cladding of a MM Raman fiber.

In accordance with one aspect of the disclosure, the high power single mode (SM) Raman laser source of the disclosure is configured with an end pumped multi-clad Raman fiber having an inner cladding, which receives multimode (MM) pump radiation propagating along a path at a wavelength λpump, and a MM core provided with a central core region. The pump radiation is sufficiently powerful to produce Raman scattering converting the pump radiation to a signal radiation at a Raman-shifted or signal wavelength λram which is longer than wavelength λpump.

The disclosed Raman laser source further has spaced wavelength selective reflectors, such as fiber Bragg gratings (FBG), defining therebetween a resonator for the signal radiation. The discriminator and central core channel are optically aligned and dimensioned to match the FM of the signal radiation which is output from the Raman fiber with an $M^2 \leq 1.1$ (preferably $\leq 1.05$) in a power reaching tens of kilowatts (kW).

The SM Raman laser source is further configured with a MM feeding fiber located upstream from and delivering the pump radiation to the Raman fiber. The feeding and Raman fibers may be directly spliced to one another or spaced from one another.

In the configuration characterized by spaced apart feeding and MM fibers, the disclosed laser source further includes bulk optics shaping the pump radiation so as that the latter is coupled into the inner cladding of the Raman fiber. Additionally a slanted reflector may be located between the lenses to deflect backreflected radiation at the signal wavelength λram off the path to protect pump lasers.

BRIEF DESCRIPTION OF THE DRAWINGS

The above and other features and advantages will become more readily apparent from the subsequent specific description accompanied with the following drawings, in which:

FIGS. 1A and 1B are respective schematic views of the inventive all fiber Raman source in accordance with two structural modifications.

FIG. 2 is the inventive Raman source utilizing free space communication between feeding and Raman fibers.

DETAILED DESCRIPTION

Figure 3:
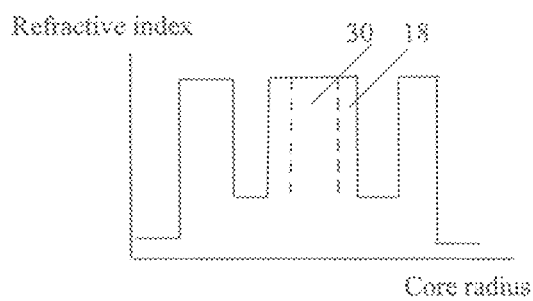
FIG. 3 illustrates the refractive index profile of the inventive Raman fiber.

Reference will now be made in detail to embodiments of the invention. The features of the invention can be used individually or in combination with selected or all other inventive features in each of the disclosed configurations of the inventive Raman source. Wherever possible, same or similar reference numerals are used in the drawings and the description to refer to the same or like parts or steps. The drawings are in simplified form and are not to precise scale. The term "couple" and similar terms do not necessarily denote direct and immediate connections, but also include connections through intermediate elements or devices.

FIG. 1A illustrates a Raman fiber laser source 10 configured with multiple SM or MM laser pumps 2 which are preferably, but not necessarily based on fiber lasers each capable of outputting SM pump bright light having a power reaching a kilowatt (kW) level. For example, individual SM fiber laser pumps 2 each are operative to output 1 kW SM pump light. The SM fiber laser pumps may optionally have a master oscillator power fiber amplifier (MOPFA) configuration.

The output passive fibers 4 of respective laser pumps 2 are coupled together in a well-known manner by a fiber combiner having an output fiber 6 which is further referred to as the feeding fiber. The combination of multiple pump outputs results in a multi kW cumulative pump light that depends only on reasonable number of pumps 2 and their individual output powers. For example, a power range between 5 and 100 kW in a CW regime is readily accessible today. The beam quality of cumulative pump light is very good at these powers, but with forever increasing industrial demands, it could be further improved. The combiner coupling multiple output fibers to produce a low- or MM output is referred to as SM-LM or LM-/MM combiner depending on the modality of individual pumps and the $M^2$ factor of the cumulative pump beam.

The feeding fiber 6 is configured with a cladding 8 surrounding a MM core 12 which guides the cumulative pump light towards a MM Raman fiber 14 which is butt spliced to the output end of feeding fiber 6. The MM fiber Raman laser (FRL) is configured to support the propagation of substantially only a single, FM through the beam cleanup effect of SRS in multimode fibers. High pump light powers require that feeding fiber 6 has MM core 12 with a relatively large dimeter, such as 50 to 100 μm which matches a waveguiding inner cladding 16 of double clad MM Raman fiber 14.

The diameters of MM Raman core 18 and cladding 16 are selected to ensure the effective absorption of the pump light over the shortest possible length of the MM Raman core. The latter outputs kW signal light in a fundamental mode at the desired signal light wavelength which is preferably the 1st Stokes wavelength.

Figure 4:
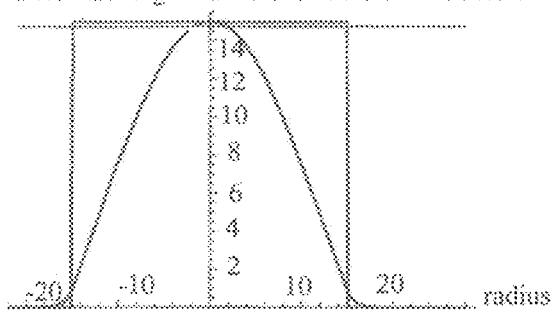

To insure the near diffraction-limited signal light at the desired signal wavelength, such as $1^{st}$ Stokes wave, Raman source 10 includes a combination of a central core region 30 in Raman fiber 14 and strong and weak FBGs 26 and 28, respectively, with respective pitches adjusted for the effective index of the FM. The spaced FBGs 26 and 28 are written directly in MM Raman core 18 to define a Raman resonant cavity for the desired $1^{st}$ Stokes wavelength. may occupy no more than 70% of the entire The central core region 30 is incorporated within the resonant cavity and doped, as the rest of the core as illustrated in FIGS. 3 and 4 with impurities which are selected from boron, known to one of ordinary skill in the optical fiber arts to lower the refractive index, germanium, phosphorous or a combination of these. The central region 30 core area which is substantially the core region occupied by the FM, whereas HOMs tend to occupy the periphery of core area 18. Since central core region 30 is dimensioned to substantially match the mode field diameter of FM, it is amplified incomparably greater than the majority of HOMs which are thus reduced to the background noise at the output of Raman fiber 14. Accordingly, the above-disclosed structure ensures that the signal radiation emitted from Raman fiber 14 is in the FM.

Optionally, as diagrammatically shown in FIG. 1B, an intermediary MM passive fiber 15 can be spliced to the opposing ends of respective feeding and Raman fibers. Despite having a MM core 17, the intermediary fiber can be configured to support the propagation of only a FM with a MFD substantially matching that of the FM supported in Raman core 18. In this modification, strong FBG 26 may be written in the intermediary fiber. If a pure SM is required, the shown structure may have a SM output fiber 22 which is coupled to the output end of Raman fiber 14. The weak FBG 28 may be written in SM core 24 of output fiber 22. If both FBGs are formed onto respective intermediary and output passive fibers, central core region 30 of Raman fiber 14 may remain undoped.

FIG. 2 shows an alternative architecture of the disclosed Raman source 10. While the cumulative pump light from MM feeding fiber 6 propagates over free space, it is incident on a guiding optic assembly which includes spaced apart collimating and focusing lenses 25, 35 respectively. As a result, the pump light is focused on the cladding of Raman fiber 14. Positioned between lenses 25 and 35 is a slanted reflector 45 preventing the propagation of backreflected Raman light toward upstream to SM laser pumps 2 shown in FIG. 1. The remaining structure is analogous to that of FIG. 1.

Figure 5:
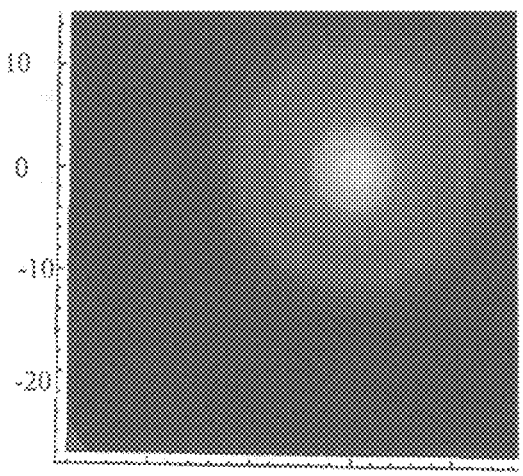
FIGS. 4 and 5 illustrate respective field and intensity profiles of the fundamental mode in the exemplary inventive structure of FIGS. 1 and 2.

FIG. 3 illustrates an example of Raman fiber 14 of FIGS. 1 and 2 having 30 μm MM core 18 with central core region 30 being of about 20 μm. The tests conducted with this index profile of Raman fiber 14 show good results as can be seen in FIGS. 4 and 5 illustrating field and intensity profile for fundamental mode LPo. The configuration used in the tests include SM fiber laser pumps operated at 1070 nm, whereas SM Raman signal light was generated at 1120 nm. All of the above ranges of fibers shown in FIGS. 1 and 2 are exemplary and can be altered without however deviating from the scope of the invention. As shown, the refractive index profile of inner cladding 16 has a depressed portion due to the fluorine-doped inner region. Otherwise, the raised region of cladding 16 and Raman core 18, which may be made of pure silica and thus have substantially the same refractive index. The central core region 30 is doped with a combination of Raman gain increasing impurities and silica refractive index decreasing impurities which lower the central core region refractive index to that of the Raman core and cladding 16.

Figure 6:
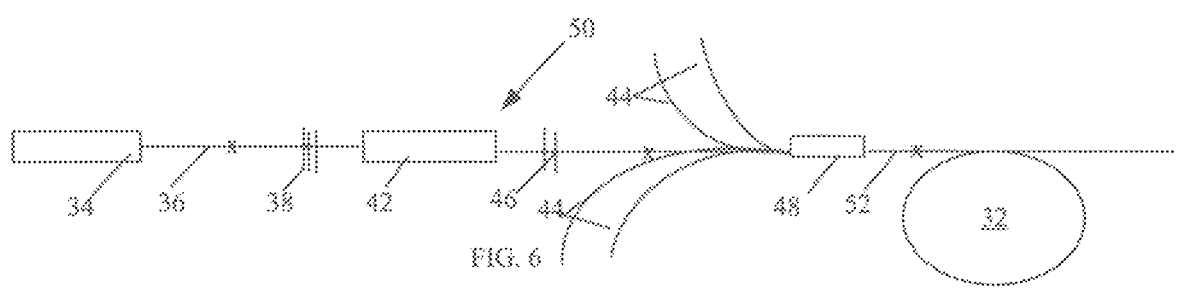
FIG. 6 illustrates the inventive Fiber laser source featuring a fiber Raman amplifier.

FIG. 6 illustrates another aspect of the disclosure wherein fiber Raman source 50 is configured with a MM fiber Raman amplifier (FRA) 32. The realization of this requires a SM seed laser source 34 configured as a SM fiber laser or pigtailed SM diode laser. The seed 34 outputs a SM signal beam at the desired Raman wavelength $\lambda$ram, such as 1120 nm, which is guided in a SM fiber 36. The wavelength range of pump and therefore signal wavelengths is not limited to a 1-2 micron interval and extends well beyond it.

The seed 34 may include a SM DL or SM fiber laser. The SM fiber 36 may be directly spliced to a central fiber of a SM-MM combiner 48 or, as shown, to a strong FBG 38 which together with a weak FBG 46 are part of a central SM fiber laser pump 42. Here, like in the schematics of FIGS. 1 and 2, the SM-MM combiner is coupled to central and multiple SM fiber laser pumps 42 and 44, respectively, on the input end and to a feeding fiber 52 on the output end. The feeding fiber 52 is configured with a core supporting the SM signal beam, and a cladding guiding the cumulative pump beam at a wavelength $\lambda$pump shorter than the desired Raman wavelength, for example, it may be 1070 nm. End-spliced to a double-clad FRA 32, the cumulative MM pump beam is coupled into the cladding of FRA, while signal beam into the MM core of the FRA.

Alternatively, element 42 of FIG. 6 may be configured as a seed laser outputting light at the first Stokes wavelength, such as 1120 nm. The rest of the configuration remains the same as disclosed above except for component 34.

As the cumulative pump beam continuously cross the MM core of ERA 32, its energy is transferred to a $1^{st}$ Stoke wave. The suppression of high order Stokes waves is realized by the calculated length of the Raman fiber and the ratio between MM core and cladding diameters. The amplification of the fundamental mode at the expense of high order transverse modes is a result of matched MFDs of respective feeding and Raman fibers and their alignment. The MM Raman core may be provided with a central region doped with ions of standard Raman dopants and dimensioned to correspond to the MFD of the fundamental mode, like in the embodiments of FIGS. 1A, 1B and 2. If the residual, unabsorbed pump light still propagates through the cladding of the Raman fiber, a mode stripper may be arranged along the downstream stretch of a fiber train in any of embodiments of respective FIGS. 1, 2 and 6.

Although the present disclosure has been described in terms of the disclosed example, numerous modifications and/or additions to the above-disclosed embodiments would be readily apparent to one skilled in the laser arts without departing however from the scope and spirit of the following claims.

The invention claimed is:

1. A high power single mode (SM) Raman laser source comprising:
    an end pumped multi-clad Raman fiber having:
        an inner cladding, which receives multimode (MM) pump radiation propagating along a path at a wavelength $\lambda$pump, and
        a MM core surrounded by the inner cladding and provided with a central core region which has a diameter smaller than that of the MM core, the pump radiation producing Raman scattering which induces a conversion of the pump radiation to a signal radiation at a Raman-shifted wavelength $\lambda$ram>than wavelength $\lambda$pump,
    the central core region being dimensioned to confine a fundamental mode (FM) of the signal radiation and doped with Raman gain enhancing impurities and silica refractive index decreasing impurities which provide the MM core including the central core region with a uniform refractive index; and
    spaced wavelength-selective reflectors defining therebetween a resonator for the FM at the wavelength $\lambda$ram which at least partially includes the central core region, the wavelength-selective reflectors each being dimensioned to have a diameter which does not exceed the diameter of the central core region, wherein the Raman fiber outputs the signal radiation in the FM with an $1 \leq M^2 \leq 1.1$ in a power range between a few kilowatts (kW) and tens of kWs.

2. The SM Raman laser source of claim 1 further comprising a MM feeding fiber located upstream from and delivering the pump radiation to an upstream end of the Raman fiber.

3. The SM Raman laser source of claim 2, wherein the MM feeding and Raman fibers are directly spliced to one another, the wavelength-selective reflectors being fiber Bragg gratings (FBG) formed in the central core region.

4. The SM Raman laser source of claim 2 further comprising a MM intermediary passive fiber spliced to opposing ends of the respective feeding and Raman fibers and configured with a MM core which supports propagation of only a FM of the intermediary fiber, wherein the FM of the intermediary and Raman fibers having respective mode field diameters match one another.

5. The SM Raman fiber laser of claim 4 further comprising a SM output passive fiber spliced to a downstream end of the Raman fiber, the wavelength reflectors being respective fiber Bragg gratings written in cores of the respective intermediary and SM output passive fibers and optically aligned with the central core region.

6. The SM Raman laser source of claim 2 further comprising collimating and focusing lenses positioned between the MM feeding fiber and Raman fiber, and a slanted minor between the lenses deflecting backreflected light off the path.

7. The SM Raman fiber laser of claim 1 further comprising a plurality of fiber laser pumps having respective output fibers which are coupled together in a combiner so that outputs of respective fiber laser pumps constructively interfere with one another to produce the high power MM pump radiation at the pump wavelength $\lambda$pump.

8. The SM Raman laser of claim 1, wherein the pump wavelength $\lambda$pump is 1070 nm and the signal wavelength $\lambda$ram is 1120 nm.

9. The SM Raman fiber laser of claim 1, wherein the inner cladding has regions spaced radially outwards from the MM core and doped with fluorine to provide a refractive index depression.

\* \* \* \* \*